US009764439B2

(12) United States Patent
Besuchet et al.

(10) Patent No.: US 9,764,439 B2
(45) Date of Patent: Sep. 19, 2017

(54) HIGH VOLTAGE CRASH PREVENTION DEVICE FOR MACHINE TOOLS

(71) Applicant: Mikron Agie Charmilles SA, Nidau (CH)

(72) Inventors: Jean-Philippe Besuchet, Neuchatel (CH); Juergen Reichenbaecher, Busswil (CH); David Schranz, Ipsach (CH); Gilbert Bovay, Lausanne (CH); Nicola Giandomenico, Troinex (CH)

(73) Assignee: MIKRON AGIE CHARMILLES SA, Nidau (CH)

( * ) Notice: Subject to any disclaimer, the term of this patent is extended or adjusted under 35 U.S.C. 154(b) by 0 days.

(21) Appl. No.: 14/847,095

(22) Filed: Sep. 8, 2015

(65) Prior Publication Data

US 2016/0082562 A1    Mar. 24, 2016

(30) Foreign Application Priority Data

Sep. 19, 2014 (EP) ..................... 14185502

(51) Int. Cl.
*G06F 19/00* (2011.01)
*B23Q 17/22* (2006.01)
*G05B 19/4061* (2006.01)

(52) U.S. Cl.
CPC ..... *B23Q 17/2208* (2013.01); *G05B 19/4061* (2013.01); *G05B 2219/40339* (2013.01); *G05B 2219/49141* (2013.01)

(58) Field of Classification Search
CPC ...... G05B 19/4061; G05B 2219/35316; G05B 2219/49157; G05B 19/19; G05B 19/4093;

(Continued)

(56) References Cited

U.S. PATENT DOCUMENTS 3,558,843 A * 1/1971 O'Connor ............... B23H 1/04
                                                    219/69.15
4,226,697 A * 10/1980 Antonov .................. B23H 7/16
                                                    204/298.41

(Continued)

FOREIGN PATENT DOCUMENTS

DE    102007032498 A1    1/2009
EP         1398110 A1    3/2004

(Continued)

*Primary Examiner* — Darrin Dunn
(74) *Attorney, Agent, or Firm* — Leydig, Voit & Mayer, Ltd.

(57) ABSTRACT

A crash prevention device for a machine tool for preventing the collision of a moving part of the machine tool with other machine tool parts or with a workpiece in a working area of the machine tool includes an isolation mechanism that electrically isolates the moving part from the other machine tool parts or the workpiece. The device includes a detection system with a high voltage generator having a first positive connector electrically connected to the moving part and a negative connector electrically connected to the workpiece or to the other machine tool parts. The high voltage generator generates DC, AC, or pulsating voltage. The detection system includes a discharge detection device that detects an electrical discharge between the moving part and the workpiece or between the moving part and the other machine tool parts, then sends a signal to stop or adapt further relative movement of the moving part.

18 Claims, 2 Drawing Sheets

(58) Field of Classification Search
CPC .............. G05B 19/182; G05B 19/18; G05B 2219/35097; G05B 2219/37237; G05B 2219/39082; G05B 2219/39135; G05B 2219/40317; B23H 1/02; B23H 1/00; B23H 7/18
See application file for complete search history.

(56) References Cited

U.S. PATENT DOCUMENTS

| | | | | |
|---|---|---|---|---|
| 4,963,710 | A * | 10/1990 | Lach | B24B 49/10 219/69.16 |
| 5,811,757 | A * | 9/1998 | Higgins | H05H 1/36 219/130.32 |
| 6,481,939 | B1 | 11/2002 | Gillespie et al. | |
| 7,198,043 | B1 * | 4/2007 | Zhang | B23B 1/00 125/39 |
| 8,710,392 | B2 * | 4/2014 | Mironets | B23H 1/02 219/69.13 |
| 2003/0060909 | A1 * | 3/2003 | Yamato | G05B 19/4061 700/90 |
| 2003/0062342 | A1 * | 4/2003 | Akiyoshi | B23H 7/16 219/69.16 |
| 2004/0052601 | A1 | 3/2004 | Bernhard et al. | |
| 2005/0283270 | A1 * | 12/2005 | Nakamura | G05B 19/4069 700/178 |
| 2008/0018287 | A1 * | 1/2008 | Ogawa | G05B 19/4061 318/652 |
| 2008/0021591 | A1 * | 1/2008 | Tani | G05B 19/4061 700/178 |
| 2008/0125874 | A1 * | 5/2008 | Takahashi | G05B 19/408 700/7 |
| 2009/0018001 | A1 | 1/2009 | Jakob | |
| 2009/0062955 | A1 * | 3/2009 | Ide | G05B 19/4061 700/178 |
| 2010/0087948 | A1 * | 4/2010 | Yamaguchi | G05B 19/4069 700/178 |
| 2011/0106291 | A1 * | 5/2011 | Matsumoto | B23Q 39/027 700/178 |
| 2011/0210687 | A1 * | 9/2011 | Tsuji | H02P 21/0003 318/400.02 |
| 2012/0004760 | A1 | 1/2012 | Bonerz et al. | |
| 2012/0152907 | A1 * | 6/2012 | Chen | B23H 1/022 219/69.13 |
| 2012/0221137 | A1 * | 8/2012 | Kettemer | G05B 19/4061 700/108 |
| 2012/0239182 | A1 * | 9/2012 | Kikata | G05B 19/4061 700/186 |
| 2013/0184852 | A1 * | 7/2013 | Kubo | G05B 19/4061 700/178 |
| 2013/0325163 | A1 * | 12/2013 | Katougi | B23H 7/18 700/162 |
| 2014/0076856 | A1 * | 3/2014 | Furuta | B23H 7/065 219/69.11 |
| 2014/0103014 | A1 * | 4/2014 | Arakawa | B23H 7/04 219/69.12 |
| 2015/0045941 | A1 * | 2/2015 | Mitsuhashi | G05B 19/4061 700/178 |
| 2015/0120036 | A1 * | 4/2015 | Yahaba | G05B 19/18 700/184 |
| 2015/0134105 | A1 * | 5/2015 | Iuchi | G05B 19/4155 700/186 |
| 2015/0261201 | A1 * | 9/2015 | Bretschneider | G05B 19/19 700/193 |

FOREIGN PATENT DOCUMENTS

| | | |
|---|---|---|
| EP | 2165803 B1 | 3/2010 |
| EP | 2402114 A1 | 1/2012 |
| WO | WO 2006128892 A1 | 12/2006 |
| WO | WO 2012056520 A1 | 5/2012 |

* cited by examiner

HIGH VOLTAGE CRASH PREVENTION DEVICE FOR MACHINE TOOLS

CROSS-REFERENCE TO PRIOR APPLICATION

Priority is claimed to European Patent Application No. 14 185 502.3, filed on Sep. 19, 2014, the entire disclosure of which is hereby incorporated by reference herein.

FIELD

The present invention relates to a crash prevention device for machine tools preventing the collision of a moving part of the machine tool with other machine parts.

BACKGROUND

Crash prevention devices for machine tools are known in the field of workpiece machining with machine tools like milling, turning or electrical discharge machining (EDM). The tools used in machine tools—typically milling, drilling or swivel heads—are normally interchangeable and depend on the machining process to be performed. Quite often the machining of one workpiece requests the use of several different tools. The tool change can be conducted manually by an operator, semi-automatically or fully automated (e.g. in computerized machining centers). Such tool changes request in the outmost cases a non-machining movement of the employed tool respectively of the machining head to which the tool to be changed is attached, away from workpiece or towards the workpiece for continuing the machining process. During these and other non-machining movements of the employed tool (e.g. a new part setup process) as during normal machining movements, an inherent risk of collision respectively crash of the machining head or of the thereon clamped tool with the workpiece or with other machine parts always exists. Such a collision is highly undesired because it can damage a workpiece, the tool or, worse, the machine tool. Since in such situations the tools are always clamped in the chuck of the machining head, a collision can imply severe damages on the support or mounting of the machine head or on other machine elements (e.g. motor spindle, tool or workpiece chuck, machine table etc.), causing therewith a very expensive breakdown of the entire machine tool for a longer time and expensive reparation costs. Particularly unpleasant are smaller crashes which occur undetected causing the imprecise (mass) production of workpieces respectively subsequent massive discards.

Avoiding these types of collisions and crashes has therefore always been an important part of operating a machine tool. In machine tools operated manually, in numerically controlled machine tools or in computerized machining cells, the clamped workpiece and its exact position is first measured. This is done to ensure that for starting the subsequent machining process, the tool is not crashing in the workpiece, but first precisely positioned by a non-machining movement of the tool respectively machining head just next to the workpiece. It is obvious that a visual observation of the non-machining movement of the tool by the operator helps to prevent undesired crashes (although human failure can never be excluded completely). In semi and particularly in fully automated machine tools a constant visual observation is of course neither desired nor possible considering the travel speed of modern machining heads. A necessity for reliable crash prevention systems is consequently given today in this technical field.

In the past years efforts were made in this direction. The document U.S. Pat. No. 6,481,939 B1 discloses for instance a tool tip conductivity sensor. The device detects when a tool tip of a machine contacts a workpiece. The apparatus is intended for an accurate determination of the first contact of the tool with the workpiece to ensure the correct subsequent machining of the workpiece, respectively the further machining operation (in the given example for the subsequent drilling of a workpiece with the tool).

Another publication, the WO 2006/128892 A1, illustrates a device and method for detecting tool breakages—here drilling heads—during a machining operation by using electrical conductivity. The disclosed system measures an electrical variable, which is compared from time to time with threshold values in order to detect deviations deriving from possible tool malfunctions and breakages. The machine can be stopped automatically once such a deviating signal is detected.

The document EP 2 165 803 B1 discloses a similar but more sophisticated control system for controlling the state of a tool during machining operations. The device can monitor high-speed micromachining operations, offering the possibility to control micro tools used in such applications. The system uses alternating current as a signal for its measuring purpose. The signal is produced by a generator and measured by a voltage measuring device. The (high) frequency of the alternating current—in the range of 1 to 60 MHz—is chosen in dependence of the monitored electrical circuit (mainly comprising machine head, tool and machine table). The contact or non-contact of the used micro tool with the workpiece causes a difference in the impedance of that electrical circuit, which is measured by the voltage measuring device. Alternations of that circuit, such as tool-breakages, cause variations of the voltage in the impedance. Therewith it is possible to control the micro tool and monitor its operational condition, such as the normal machining operation, the breaking of the used work tool or even occurred machine collisions. In fact, the system offers the possibility to foresee the stop of the movement of the machine once a collision is detected.

The disadvantage of the control system according to EP 2 165 803 B1—as of all other foregoing cited technical solutions—is that a collision is just detected once it has already occurred. While in micro machining operations—with minimal feed rates respectively tool movements—a system according to the EP 2 165 803 B1 might still be sufficient to prevent severe damages, such a system is not adequate for ordinary or high speed milling machines with feed rates and tool movements in complete other magnitudes.

Further, it is known on the market to utilize crash avoidance systems. These systems function on a model-basis, assuming the position of workpiece or other potential colliding elements according to data feed to the system. Does the tool/machine head for example approach the assumed position of the workpiece, the system slows down the movements to avoid an eventual collision with the workpiece. The limit of such an approach is that only a sub set of the colliding elements can be taken into account by the model or the model is inaccurate (i.e. missing or approximated elements). The company Heidenhain sells for instance such a system, known on the market as "DCM".

Further, mechanical crash mitigation systems are also known and disclosed for instance in the documents EP 1 398 110 A1 and DE 10 2007 032 498 A1. Such systems prevent bigger and severe damages, but cannot contribute to avoid all damages by example at all possible speeds or with all possible tool geometries and therefore require the machine tool to be used at a reduced speed.

In ordinary and particularly in high speed milling machines a collision should not only be mitigated, but imminent collisions should preferably be detected before they actually occur to permit therewith the stoppage of the movement of a tool/machining head right in time, avoiding that a tool crashes in the workpiece or in other machine elements at all. Only in that way it is possible to avoid any damage.

An approach in this direction is given by the system disclosed in the document EP 2 402 11 B1 of the company Ott-Jakob Spanntechnik GmbH. This document discloses a plurality of distance sensor which are allocated at the end of the motor spindle circumferentially around the axis of the spindle respectively around the mounted tool. These sensors have an overlapping detection field and work with radar or ultrasound sensing means. Such a system is able to prevent a crash, however the requested equipment for the detection system is rather sophisticated and complex. Further it requests quite expensive sensor means and today these systems are still not accurate enough for industrial application.

SUMMARY

A crash prevention device for a machine tool for preventing the collision of a moving part of the machine tool, such as a tool, a chuck or tool holder, a machine spindle, or a machining head of the machine tool, with other machine tool parts or with a workpiece in a working area of the machine tool during a movement of the moving part includes an isolation mechanism that electrically isolates the moving part from at least one of the other machine tool parts or the workpiece and a detection system. The detection system includes a high voltage generator with a first positive connector and a negative connector. The first positive connector is electrically connected to the moving part. The negative connector is electrically connected to the workpiece or to the other machine tool parts. The high voltage generator generates at the first positive connector and the negative connector DC, AC, or pulsating voltage. The detection system also includes a discharge detection device that detects an electrical discharge occurring between the moving part and the workpiece or between the moving part and the other machine tool parts. Upon detecting the electrical discharge, the detection system sends a signal to a machine controller of the machine tool to stop or adapt further relative movement of the moving part towards the other machine tool parts or the workpiece.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

BRIEF DESCRIPTION

Thanks to the inventive crash prevention device, it is possible to detect an electric discharge once a moving part of the machine tool, e.g. the tool or a part of the moving machining head, is in the proximity of the workpiece or of another machine tool part which is electrical conductive are electrically connected via a connector to the inventive detection system. An electric discharge occurs via an electric arc and signalizes therewith that a moving part of the machine tool is at a certain distance from another machine tool part connected to the crash prevention device and its detection system. In that way an imminent crash can be detected before it actually occurs, leaving enough time to send a signal to a machine controller which stops the advancement of the tool respectively machine head before the collision actually happens. Having expensive sensors allocated at several locations of a machine spindle or machining head for ensuring a broad detection field is avoided same as having a sophisticated sensor system.

Figure 1:
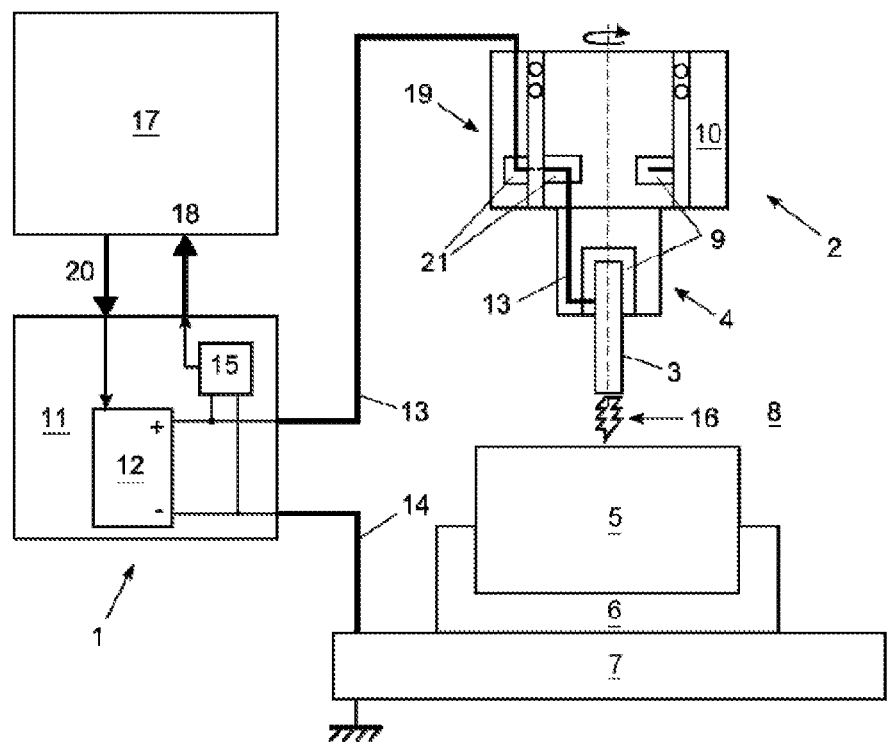
FIG. 1 illustrates a machine tool which is connected with a crash prevention device according to the invention.

FIG. 1 illustrates a machine tool 2 which is connected with a crash prevention device 1 according to the invention. In this example, the only moving part which is monitored is the tool 3. The tool 3 intended to machine the workpiece 5 is clamped by the chuck 4 attached to the machine spindle 10 of a machining head 19. The tool 3 is electrically isolated by isolation mechanism 9 in respect of the chuck respectively tool holder 4 and in respect of the rest of the machine tool 2 (e.g. machining head 19). To the clamped and electrically isolated tool 3 an electrical voltage is applied via a positive connector 13 (e.g. an electrical cable).

The positive connector 13 is hereby equipped with a contact-free connecting part 21. That contact-free connecting part 21 is designed to allow the formation of an electrical arc once an electrical discharge 16 should occur between the monitored tool 3 and the workpiece 5 or between the monitored tool 3 and another machine tool part (e.g. clamping system 6 or machine table 7) allocated in the working area 8 of the machine tool 2 during a movement of the tool 3. Instead of using a contact-free connecting part, it would also be possible to use a conventional electrical contact brush or similar. However the use of such a contact brush is disadvantageously, since such parts might be quickly affected by abrasive wear.

The positive connector 13 connects the tool 3 with the inventive crash prevention device 1. The crash prevention device 1 is also connected via a negative connector 14 with the workpiece 5, the clamping system 6 of the workpiece 5, the machine table 7 and eventually further surrounding machine tool parts located in the working area 8 of the machine tool 2, which could potentially collide with the moveable tool 3 or another moving part (e.g. chuck 4, machine spindle 10 or other parts of the machining head 19). Being made of metal, the workpiece 5, the clamping system 6 and the machine table 7 are usually anyway electrically connected with each other. Usually, these elements are also electrically grounded. The positive connector 13 and the negative connector 14 are connected separately to the inventive crash prevention device 1.

The inventive device 1 displayed in FIG. 1 contains further a detection system 11, which includes a high voltage generator 12 generating high voltages (DC, AC or pulsating voltage) of definable value and which are applied to the positive connector 13. The high voltage generator 12 is also connected via the negative connector 14 to the workpiece and further surrounding machine tool parts (see explanations given above). The detection system 11 includes also an discharge detection device 15 (e.g. a current flow is detected), which is able to detect an occurring electrical discharge 16 between the tool 3 and another element in the working area 8 of the machine tool 2 (for example the workpiece 5, the clamping system 6 or the machine table 7). The discharge detection device 15 respectively the detection system 11 is able to process and eventually even evaluate the detected and measured electrical discharge 16. A processing unit can be foreseen for this purpose in the electrical discharge detection device 15 respectively in the detection system 11. The detected electrical discharge 16 is transmitted as a signal from the detection system 11 to an input 18 of the machine controller 17. Upon received signal, the machine controller 17 will stop or adapt the movement of the tool 3 respectively of the machining head 19 (typically reduce speed, change movement path etc.) to avoid an imminent crash of the tool 3 with another machine tool part. There are several possibilities for the discharge detection device 15 to detect the occurrence of an electrical discharge 16. One or a combination of the following detection methods are think- and applicable:

Electrical measurement of a current flow and/or voltage change between the connectors 13 and 14 due to the occurring electrical discharge 16;

visual detection of an occurring electrical discharge 16 in the working area 8, preferably by the use of a camera;

measurement of changes in the existing respectively formed electrical fields.

Figure 2:
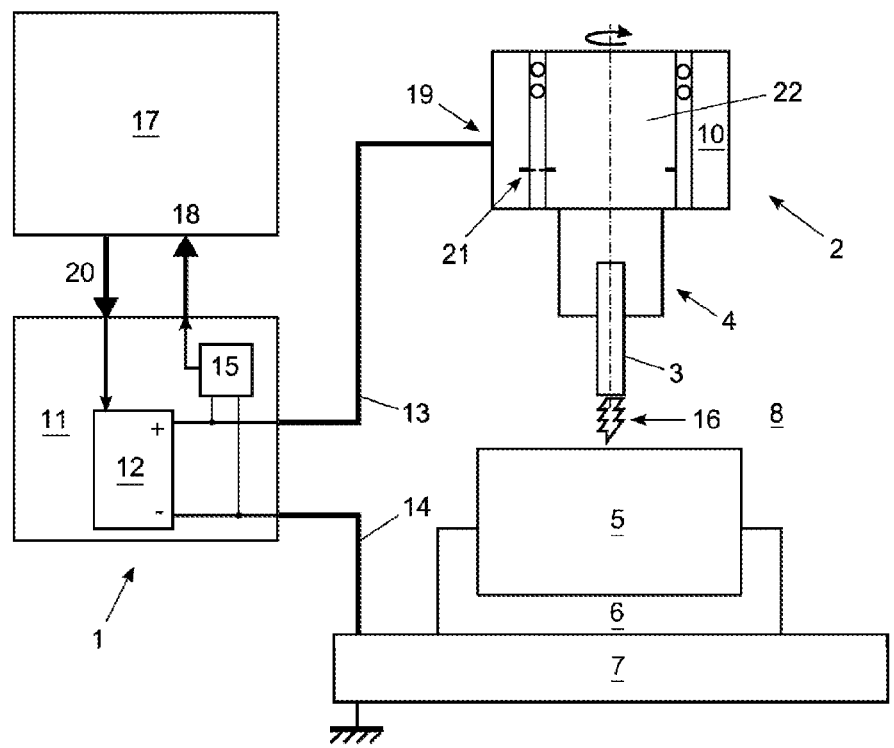
FIG. 2 shows another example of the invention in which the crash prevention device is not only monitoring the tool as moving part, but the motion of the entire machining head.

FIG. 2 shows another example of the invention in which the crash prevention device 1 is not only monitoring the tool 3 as moving part, but the motion of the entire machining head 19. In this configuration, the connector 13 applies a high voltage to the machine spindle 10 and—over its contact-free connecting part 21—also to the rotating rotor spindle 22 and therewith—since these elements are electrically connected—to the chuck 4 and to the tool 3. Therewith the entire moveable machining head 19 and further parts attached to it (like the tool 3) will be monitored to prevent collisions with other machine tool parts allocated in the working area 8 of the machine tool 2.

From the just explained technical principle of the invention, several different implementations of the invention are imaginable. The signal sent to the input 18 can in the simplest implementation just be an indicator to the machine controller 17 to immediately stop the movement of the tool 3. In a more sophisticated implementation of the invention, the detection system 11 or its electrical discharge detection device 15 is able to evaluate the occurred electrical discharge (e.g. duration, discharge voltage over time etc.), eventually compare it with preset parameters or with data stored in a database or to evaluate it with an installed expert system and to give more specific indications to the machine controller 17 (e.g. actual distance of the tool to the colliding element).

In a preferred embodiment of the present invention, the inventive crash prevention device is not used to just stop any further movement of the moving parts, like tool and machining head, but is instead used to switch the movement of machining head and tool from the ordinary operational speed to a lower "safe-mode" speed (e.g. sensitive feed). In this safe-mode, the forward motion of the machining head is for instance reduced to the extent that an eventual crash would be mitigated by a built-in mechanical crash mitigation system, while at "ordinary operational speed" that built-in mechanical mitigation system would not be sufficient to avoid severe damages. It is obvious that for such an embodiment the switch form "ordinary operational speed" to a lower "safe-mode" speed needs to occur at a reasonable distance between the monitored moving part (tool, entire machining head) and a stationary part (workpiece, machine table etc.). In fact, this specific embodiment of the presented inventive system could be used during the starting phase of ordinary machining operations to ensure in a first step a fast movement, respectively feed motion of the machining head/tool towards the workpiece and in a second step—once a defined distance is reached and an electrical discharge occurs—the machine controller switches to a lower "safe-mode" speed motion for moving the tool towards the workpiece on a slower speed for subsequently initiating the machining of the workpiece.

In a further improved variant of this preferred embodiment, the just mentioned two steps modes could be expanded by adding a third step: During the slower motion of the tool in the "safe-modus"—whereby workpiece and tool are still not in contact with each other—the voltage applied by the crash prevention device between tool and workpiece is adapted to a lower value, allowing the inventive device to detect a further second, more narrow distance between tool and workpiece. Such narrow distance—also detected by the subsequent occurrence of a second electric discharge—could be the distance which initiates the real machining of the workpiece.

Figure 3:
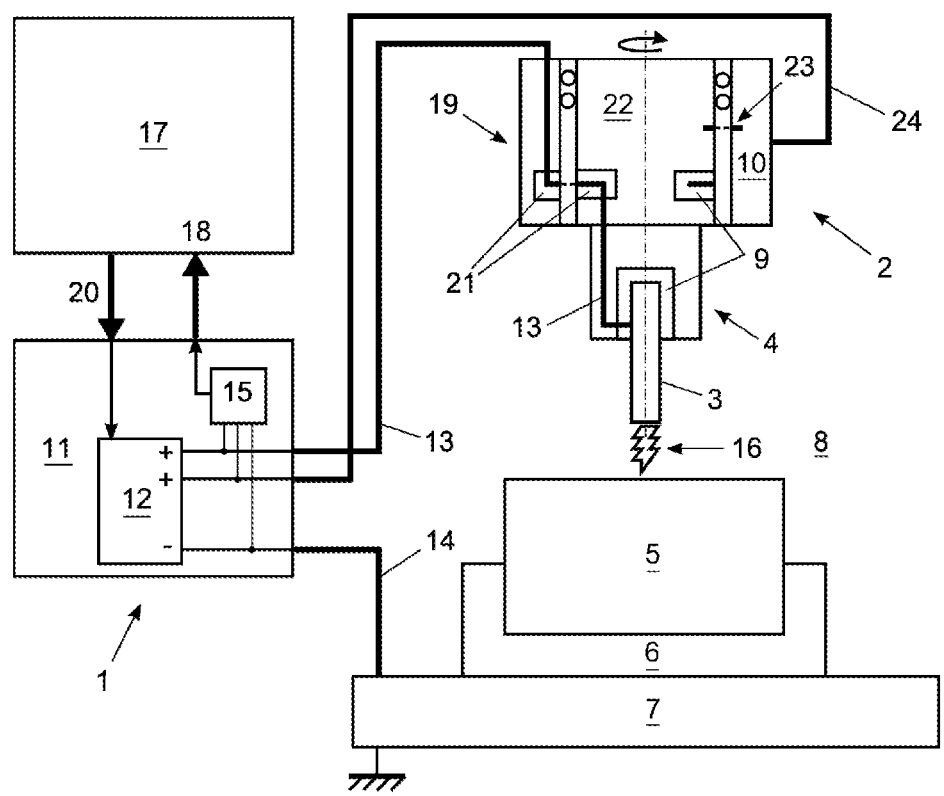
FIG. 3 shows another example of the invention in which the crash prevention device can be extended so that it will not just be able to monitor the non-machining movements of a tool or of other moving parts attached to the machining head, but also be able to monitor and prevent collisions during the ordinary machining operation of the tool.

In another advantageous embodiment of the invention, illustrated in FIG. 3, the crash prevention device 1 can be extended so that it will not just be able to monitor the non-machining movements of a tool 3 or of other moving parts attached to the machining head 19, but also be able to monitor and prevent collisions during the ordinary machining operation of the tool 3. For this purpose, the machining head 19 is electrically isolated from the rest of the machine tool frame as from the tool 3 by the isolation mechanism 9 and equipped with a further isolated positive connector 24. In this configuration, the crash prevention device 1 includes basically two independent monitored sections: One section is the isolated tool 3 and the other is the isolated machining head 19. Once the tool 3 has started machining the workpiece 5, the tool 3 and the workpiece 5 will be in constant physical contact (e.g. chip removing machining process) and therewith also in constant electrical contact. Consequently, during the workpiece machining by the moving tool 3, the inventive crash prevention device 1 will not be active in respect of the tool-section. However, since the tool 3 is electrically isolated from the chuck holder 4 and further parts of the machining head 19 by the isolation mechanism 9, the crash prevention device 1 will still be able to monitor the movement of the machining head 19 and signalize an eventual approach of the moving machining head 19 to another element in the working area 8 of the machine tool 2 by the positive connector 24.

For this purpose, the high voltage generator 12 generates a high voltage via the positive connector 24 to the machine spindle 10 and to other parts of the machining head 19. The connector 24 includes also a contact-free connecting part 23 for transmitting the high voltage to the rotating rotor spindle 22 and therewith also to the chuck 4 of the electrically isolated tool 3. By this configuration, collisions between the moving machining head 19 or parts of it (like the chuck 4 or machine spindle 10) with the workpiece 5 or clamping system 6 etc. are prevented even during the machining process of the clamped workpiece 5. The discharge detection device 15 is needs obviously also to be connected to the positive connector 24 for a correct implementation of this advantageous embodiment.

In a further variant of this advantageous embodiment, it is also possible to foresee that the detection system 11 comprises for each of the electrically isolated sections own discharge detection device 15 (in the given example two independent discharge detection device 15).

Preferably, the detection system (11) adjusts the voltage to be applied by the high voltage generator (12) in dependency of one or a combination of the following factors:
- speed of the moving parts (e.g. tool 3, chuck 4, motor spindle 10, respectively entire machining head 19);
- usage of a coolant or type of coolant used during the machining of the workpiece (5);
- material respectively metal type of machined workpiece (5);
- geometry of the employed tool (3) and/or of the tool coating type;
- the rotation speed of the tool (3) during the machining operation;
- necessary emergency breaking distance for stopping the movement of the moving part (consideration of inertia);
- speed of moving parts during milling or non-milling condition of the tool (3);
- roughing milling or finishing milling condition;
- amount of false collision warnings produced by the crash prevention device (1).

The inventive crash prevention device uses typically voltages starting around 1000 V. The used voltage can be for instance in the range of 1,000-20,000 V and is applied between the tool, machining head or further moving machine tool parts and the stationary workpiece or workpiece table. The elements under electrical voltage need to be electrically isolated from the rest of the machine or at least from the workpiece respectively machine table. The insulation could be for instance integrated in the tool holder or/and on the bearings of the machining head to which the electrical voltage is applied. For instance, appropriate isolating ceramic material could be used as isolator. Using ceramics as insulator brings the advantage to prevent any loss of structural stiffness (for instance in the tool holder). Since the high voltage generator is just generating very low electrical currents, there is no health risk for the operator or for electrical machine components which could be damaged by an occurring electrical discharge. Of course it is advantageously to have an electric shielding of the entire working area during the operation of the crash prevention device.

Preferably, the workpiece side elements (workpiece, clamping system, machine table or further surrounding machine tool parts which could potentially collide with the tool) are connected to the electrical ground of the machine. Preferably one or more negative connectors (e.g. electrical cables) connect these elements electrically with the crash detection device. Normally, the positive connector (e.g. also an electrical cable) connects the tool with the high voltage generator. Although less indicated, it could be foreseen to inverse the connections, respectively to connect the positive connector with the workpiece side and the grounding resp. negative connector with the tool (in AC-mode not relevant).

The occurrence of an electrical discharge is detected by electrical a discharge detection device, which are part of the detection system of the crash prevention device. The electrical discharge detection device detect the occurrence of an electrical discharge by which the detection systems delivers via a processing unit a signal indicating the imminent collision to the machine controller of the machine tool. That signal is preferably delivered to a fast sampled trigger input of the machine controller. Receiving that signal, the machine controller immediately stops the movement of the moving parts (e.g. tool or machining head) or switches—as described further above—from the ordinary operational speed to a lower "safe-mode" speed (e.g. sensitive feed), preventing therewith in any case an eventual severe crash.

Depending on the voltage used and on the working area conditions, the detection distance—maximal distance within an electric discharge occurs—can be approximately in the range of 5 to 10 mm. There are many parameters which influence the working area conditions. To those belong the material of the tool, the materials of other electrical conductive machine elements (e.g. workpiece), the lubrication medium (emulsion or oil) and amount (film thickness), presence of grit, humidity etc.

In a preferred embodiment of the invention, it can be foreseen that these parameters (or part of them) are preset or predetermined, for example by the operator or eventually even automatically by sensors of the crash prevention device. In accordance with these parameters, the detection system can define the voltage to be applied to the tool and estimate, once an electrical discharge occurred, the approximate distance between tool and the machine part nearby. The estimated distance might be of use for the machine controller to determine the stoppage process of the tool movement. Most preferably, the machine controller of the machine tool influences the applied voltage of the crash prevention device in dependence of the machining conditions (e.g. lubrication, travel speed of the machine head etc.) via a signal line 20.

In a further alternative implementation of the invention, the crash prevention device respectively its detection system includes a database respectively an expert system with stored working area conditions. By this database and by presetting or predetermining real condition parameters, the crash prevention device is able to better estimate the real distance between tool and the machine part nearby.

Preferably, the positive and negative connectors are connected as close as possible to the tool and the workpiece side elements.

As mentioned above, the inventive crash prevention device is not only intended and suitable to monitor the non-machining movements of the tool.

The invention comprises a crash prevention device for machine tools to prevent the collision of a moving part of the machine tool, preferably the tool or the machining head, with other machine tool parts—for example the clamping system or the machine table—or with a workpiece allocated in the working area of the machine tool during a movement of that moving part. The inventive crash prevention device includes particularly;
- an isolation mechanism for electrically isolating the moving part from other parts of the machine tool,
- a detection system, comprising a high voltage generator having at least two connectors—preferably at least one of those connectors is a positive connector and at least one of those connectors is a negative connector in case the high voltage generator is generating a DC voltage—whereby one of these at least two connectors is electrically connected to the moving part and the other—or at least one of the other—connector is electrically connected to the workpiece and/or to other electrical conductive machine tool parts allocated in the working area of the machining tool—preferably the workpiece clamping system or the machine table whereby the high voltage generator can preferably generate at its connectors DC, AC or pulsating voltages, further the detection system comprises a discharge detection device which can detect electrical discharges occurring between the moving part and the workpiece or between the moving part and other electrical conductive machine tool parts allocated in the working area of the machining tool—for example the clamping system or the machine table and whereupon an occurring electrical discharge—detected by the discharge detection device—the detection system is designed to signalize an imminent collision to a machine controller of the machine tool for stopping or adapting the further relative movement of the moving part towards other machine tool parts or workpiece.

The workpiece and further machine elements allocated in the working area of the machining tool are preferably electrically connected with each other and also preferably electrically grounded. The workpiece and the further machine elements are connected via one of the at least two connectors, preferably with the negative connector, with the high voltage generator.

In a preferred embodiment, the connector electrically connecting the workpiece and/or other electrical conductive machine tool parts allocated in the working area of the machining tool with the high voltage generator is grounded. That include also the variant, that one of the connectors respectively one electric connector of the high voltage generator is directly grounded (e.g. via an electrical cable) and the workpiece and/or other electrical conductive machine tool parts allocated in the working area of the machining tool are separately grounded (e.g. via another electrical cable).

In a further embodiment of the inventive crash prevention device for machine tools, the moving part of the machine tool is subdivided into at least two sections. Preferably one of the at least two sections is represented by the tool and another respectively the second section is represented by the tool holder (tool chuck), the machine spindle and/or the machining head. These sections are electrically isolated from each other and from other parts of the machine tool (e.g. housing, machine tool frame etc.) by a suitable isolation mechanism (material like isolating ceramics etc.). Each of these electrically isolated sections is connected by an own connector to the high voltage generator (respectively to the positive or negative pole of the high voltage generator). In a preferred embodiment, the workpiece is electrically isolated by an isolation mechanism from the clamping system or the machine table and is electrically connected to the high voltage generator by the other connector (14). Most preferably, the detection system comprises for each of the electrically isolated sections an own discharge detection device.

In one embodiment of the inventive crash prevention device for machine tools, the positive connector is represented by the connector electrically connecting the moving part with the positive pole of the high voltage generator and the negative connector is represented by the connector electrically connecting the negative pole of the high voltage generator with the workpiece and/or to other electrical conductive machine tool parts allocated in the working area of the machining tool, preferably the workpiece clamping system or the machine table.

It is possible that the high voltage generator has more than one positive connector and/or more than one negative connector.

In a preferred embodiment of the invention, the connector contains a contact-free connecting part, which is designed to allow the formation of an electrical arc once an electrical discharge occurs intended to signalize an imminent collision. Preferably such a contact-free connecting part is allocated between two—relatively to each other—moving respectively rotating parts (for example rotating motor axle and surrounding motor spindle housing). The contact-free connecting part can for example comprise a cut through cable, whereby the distance between the cut through cable parts has a distance which is shorter than the distance by which an electrical discharge between a moving part and another machine tool part should occur. Most preferably, the distance between the cut through cable parts is in the range of 0.1 to 1 mm.

According to the invention, the inventive discharge detection device detects the occurrence of an electrical discharge by one or a combination of the following detection methods:

Electrical measurement of a current flow and/or voltage change between the connectors;

Visual detection of an occurring electrical discharge in the working area, preferably by the use of a suitable camera;

Measurement of changes in the electrical fields.

Preferably the discharge detection device detecting the electrical discharge is a processing unit of the detection system which is designed to deliver a signal to a input of the machine controller of the machine tool, preferably the input of the machine controller is a fast sampled trigger input.

The voltage applied in the inventive device by the high voltage generator can be adjustable; preferably the voltage is adjustable in the range of 1,000 to 20,000 V, most preferably in the range of 1,000 to 5,000 or in the range of 5,000 to 20,000 V.

In another possible embodiment, the discharge detection device of the invention can also be designed to measure different parameters of an occurring electrical discharge, for example the discharge duration, the electrical current flow and/or the discharge voltage over time. Most preferably those parameters are sent to the machine controller of the machine tool for further evaluation of the occurred discharge.

The discharge detection device can also be designed to measure different parameters of an occurring electrical discharge—like for example the mentioned discharge duration, electrical current flow and/or discharge voltage over time etc.—to evaluate the occurred electrical discharge, preferably by comparing the measured parameters with preset parameters or with data stored in a database or to evaluate it with an installed expert system. In such a configuration, the discharge detection device can send evaluated output data, most preferably the calculated distance between the tool and the colliding element, to the machine controller of the machine tool. In a further preferred embodiment, the detection system is controlled by the machine controller.

The detection system can adjust the voltage to be applied by the high voltage generator in dependency of one or a combination of several factors. These factors could be:

speed of the moving part;
usage of a coolant or type of coolant used;
material of workpiece;
geometry of tool and/or tool coating type;
rotation speed of the tool during machining operation;
necessary emergency breaking distance;
milling or non-milling condition of the tool;
roughing milling or finishing milling condition;
amount of false collision warnings.

In a possible embodiment of the invention, the isolation mechanism for electrically isolating the moving parts (e.g.

clamped tool) from other parts of the machine tool is integrated in the tool chuck, preferably the isolation mechanism is made of isolating ceramic material.

The invention includes also an operation method for machine tools equipped with a crash prevention device according to the forgoing for starting the machining of workpieces. In this inventive operation method, the moving part of the machine tool, preferably the tool or the machining head, is moved by the machine controller from a starting point with a first speed mode (sm1) towards the workpiece to be machined, until the crash prevention device signalizes to the machine controller by its detection system the occurrence of a first electrical discharge (V1), that a predefined first distance (d1) to the workpiece (5) is reached. Whereupon the machine controller adapts the speed of the moving part of the machine tool to a second speed mode (sm2), which is lower than the first speed mode (sm1).

In such an operation method for starting the machining of workpieces it is thinkable that during the motion of the moving part of the machine tool in the second speed mode (sm2), the detection system of the crash prevention device is set to detect a predefined second distance (d2) between the moving part and the workpiece, which is lower than the first distance (d1). Once the second set distance (d2) by movement of the moving part towards the workpiece is reached and signalized to the machine controller by the detection system by the occurrence of a second electrical discharge (V2), the machine controller is able to adapt the motion of the moving part a further time. Preferably that adaptation of the motion of the moving part comprises starting or bringing the rotation of the rotor spindle to an operational speed for initiating the machining of the workpiece by the installed tool. While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES 1 crash prevention device
2 machine tool
3 tool
4 chuck or tool holder
5 workpiece
6 clamping system
7 machine table
8 working area of machine tool
9 isolation mechanism
10 machine spindle
11 detection system
12 high voltage generator
13 positive connector
14 negative connector
15 discharge detection device
16 electrical discharge
17 machine controller
18 trigger input
19 machining head
20 signal line
21 contact-free connecting part of connector 13
22 rotor spindle
23 contact-free connecting part of the connector 24
24 positive connector

What is claimed is:

1. A crash prevention device for a machine tool for preventing the collision of a moving part of the machine tool, including at least one of a tool, a chuck or tool holder, a machine spindle, or a machining head of the machine tool, with other machine tool parts, including at least one of a clamping system of the machine tool or a machine table of the machine tool, or with a workpiece in a working area of the machine tool during a movement of the moving part, the crash prevention device comprising:
    an isolation mechanism configured to electrically isolate the moving part from at least one of the other machine tool parts or the workpiece; and
    a detection system comprising:
        a high voltage generator having at least a first positive connector and a negative connector, the first positive connector being electrically connected to the moving part and the negative connector being electrically connected to at least the workpiece or to the other machine tool parts, the high voltage generator being configured to generate at the first positive connector and the negative connector at least one of DC, AC, or pulsating voltage; and
        a discharge detection device configured to detect an electrical discharge occurring between the moving part and the workpiece or between the moving part and the other machine tool parts, and upon detecting the electrical discharge, being configured to send a signal to a machine controller of the machine tool to stop or adapt further relative movement of the moving part towards the other machine tool parts or the workpiece.

2. The crash prevention device of claim 1, wherein the negative connector of the high voltage generator is electrically connected to the workpiece clamping system of the machine tool or to the machine table of the machine tool.

3. The crash prevention device of claim 1, wherein the workpiece and the other machine tool parts are electrically connected with each other and connected with the negative connector of the high voltage generator.

4. The crash prevention device of claim 1, wherein the negative connector of the high voltage generator is electrically grounded and at least one of the workpiece or the other machine tool parts are electrically grounded.

5. The crash prevention device of claim 2, wherein the workpiece is electrically isolated by the isolation mechanism from the workpiece clamping system and the machine table, and the workpiece clamping system and the machine table are electrically connected to the high voltage generator by the negative connector.

6. The crash prevention device of claim 1, wherein the discharge detection device detects the occurrence of the electrical discharge by one or a combination of the following detection methods:
    electrical measurement of at least one of a current flow or voltage change between the first positive connector and the negative connector;
    visual detection of the electrical discharge in the working area of the machine tool; and
    measurement of changes in electrical field.

7. The crash prevention device of claim 1, wherein the discharge detection device comprises a processing unit configured to deliver the signal to an input of the machine controller.

8. The crash prevention device of claim 1, wherein a voltage applied by the high voltage generator is adjustable.

9. The crash prevention device of claim 1, wherein the discharge detection device is configured to measure different parameters of the electrical discharge including at least one of electrical discharge duration, electrical current flow, or electrical discharge voltage over time.

10. The crash prevention device of claim 9, wherein the discharge detection device is configured to evaluate the electrical discharge by comparing the measured parameter with a preset parameter, by comparing the measured parameter with data stored in a database, or by evaluating the electrical discharge with an installed expert system, and configured to send evaluated output data.

11. The crash prevention device of claim 1, wherein the machine controller is configured to control the detection system.

12. The crash prevention device of claim 11, wherein the detection system is configured to adjust a voltage to be applied by the high voltage generator depending on one or a combination of the following factors:
    a speed of the moving part;
    a usage of a coolant or type of coolant used;
    a material of the workpiece;
    at least one of a geometry of or a tool coating type of the tool of the machine tool;
    a rotation speed of the tool of the machine tool during machining operation;
    a necessary emergency breaking distance;
    a milling or non-milling condition of the tool of the machine tool;
    a roughing milling or finishing milling condition; and
    an amount of false collision warnings.

13. The crash prevention device of claim 1, wherein the isolation mechanism is integrated in the chuck or tool holder of the machine tool.

14. A method for operating a machine tool equipped with the crash prevention device of claim 1 and for starting the machining of the workpiece, the method comprising:
    moving the moving part from a starting point towards the workpiece in a first speed mode until the detection system detects the occurrence of a first electrical discharge;
    sending a signal from the crash prevention device to the machine controller that a predefined first distance to the workpiece has been reached;
    adapting the speed of the moving part to a second speed mode that is lower than the first speed mode.

15. A crash prevention device for a machine tool for preventing the collision of a moving part of the machine tool, including at least one of a tool, a chuck or tool holder, a machine spindle, or a machining head of the machine tool, with other machine tool parts, including at least one of a clamping system of the machine tool or a machine table of the machine tool, or with a workpiece in a working area of the machine tool during a movement of the moving part, the crash prevention device comprising:
    an isolation mechanism configured to electrically isolate the moving part from at least one of the other machine tool parts or the workpiece; and
    a detection system comprising:
        a high voltage generator having at least a first positive connector and a negative connector, the first positive connector being electrically connected to the moving part and the negative connector being electrically connected to at least the workpiece or to the other machine tool parts, the high voltage generator being configured to generate at the first positive connector and the negative connector at least one of DC, AC, or pulsating voltage; and
        a discharge detection device configured to detect an electrical discharge occurring between the moving part and the workpiece or between the moving part and the other machine tool parts, and upon detecting the electrical discharge, being configured to send a signal to a machine controller of the machine tool to stop or adapt further relative movement of the moving part towards the other machine tool parts or the workpiece,
    wherein the negative connector of the high voltage generator is electrically connected to the workpiece clamping system of the machine tool or to the machine table of the machine tool,
    wherein the moving part comprises at least two sections, a first section of which comprises the tool of the machine tool and a second section of which comprises at least one of the chuck or tool holder of the machine tool, the machine spindle of the machine tool, or the machining head of the machine tool, the at least two sections being electrically isolated from each other and from the other machine tool parts by the isolation mechanism and each connected by at least one of the first positive connector or a second positive connector to the high voltage generator, the workpiece being electrically isolated by the isolation mechanism from the workpiece clamping system or the machine table, the workpiece being electrically connected to the high voltage generator by the negative connector, and the detection system comprising its own discharge detection device for each of the at least two sections.

16. The crash prevention device of claim 15, wherein the second positive connector electrically connects the moving part with a positive pole of the high voltage generator, and the negative connector electrically connects a negative pole of the high voltage generator with at least one of the workpiece or the other machine tool parts.

17. The crash prevention device of claim 15, wherein the first positive connector and the second positive connector comprise contact-free connecting parts configured to allow the formation of an electrical arc once the electrical discharge occurs.

18. A method for operating a machine tool and for starting the machining of a workpiece, the machine tool being equipped with a crash prevention device for the machine tool for preventing the collision of a moving part of the machine tool, including at least one of a tool, a chuck or tool holder, a machine spindle, or a machining head of the machine tool, with other machine tool parts, including at least one of a clamping system of the machine tool or a machine table of the machine tool, or with a workpiece in a working area of the machine tool during a movement of the moving part, the crash prevention device comprising:

an isolation mechanism configured to electrically isolate the moving part from at least one of the other machine tool parts or the workpiece; and a detection system comprising:
  a high voltage generator having at least a first positive connector and a negative connector, the first positive connector being electrically connected to the moving part and the negative connector being electrically connected to at least the workpiece or to the other machine tool parts, the high voltage generator being configured to generate at the first positive connector and the negative connector at least one of DC, AC, or pulsating voltage; and
  a discharge detection device configured to detect an electrical discharge occurring between the moving part and the workpiece or between the moving part and the other machine tool parts, and upon detecting the electrical discharge, being configured to send a signal to a machine controller of the machine tool to stop or adapt further relative movement of the moving part towards the other machine tool parts or the workpiece, the method comprising:

moving the moving part from a starting point towards the workpiece in a first speed mode until the detection system detects the occurrence of a first electrical discharge;

sending a signal from the crash prevention device to the machine controller that a predefined first distance to the workpiece has been reached; and adapting the speed of the moving part to a second speed mode that is lower than the first speed mode, wherein during a motion of the moving part in the second speed mode, the detection system is configured to detect a predefined second distance between the moving part and the workpiece, the predefined second distance being smaller than the predefined first distance, and once the predefined second distance is reached, the detection system detects the occurrence of a second electrical discharge, the crash prevention device sends a signal to the machine controller, and the machine controller adapts the motion of the moving part by bringing a rotation of a rotor spindle of the machine tool to an operational speed for initiating the machining of the workpiece by the tool of the machine tool.

* * * * *